Jan. 18, 1927. 1,614,926
G. N. JEPPSON ET AL
METHOD OF MAKING LAMINATED CERAMIC ARTICLES
Filed Feb. 9, 1923
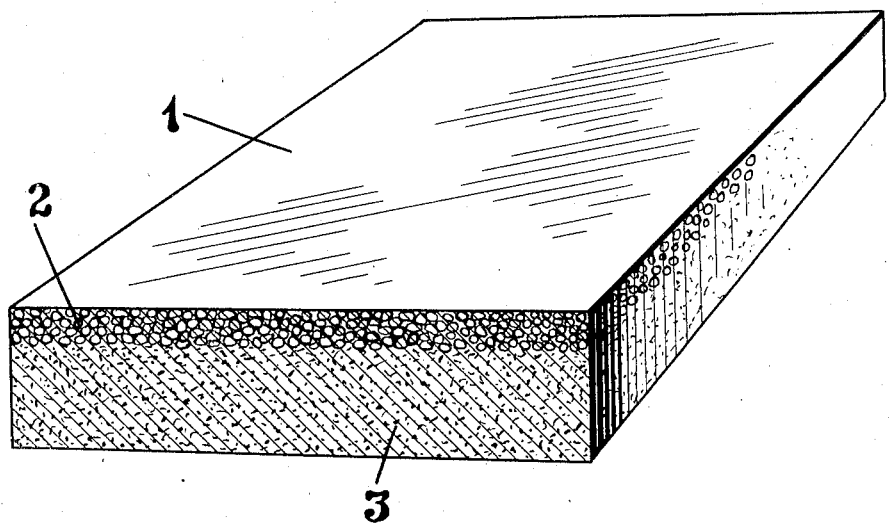
Witnesses
Harold W. Eaton
Leah A. Sessions
Inventors
George N. Jeppson
Milton F. Beecher
By
Attorney Patented Jan. 18, 1927.

1,614,926

UNITED STATES PATENT OFFICE.

GEORGE N. JEPPSON AND MILTON F. BEECHER, OF WORCESTER, MASSACHUSETTS, ASSIGNORS TO NORTON COMPANY, OF WORCESTER, MASSACHUSETTS, A CORPORATION OF MASSACHUSETTS.

METHOD OF MAKING LAMINATED CERAMIC ARTICLES.

Application filed February 9, 1923. Serial No. 617,995.

This invention relates to a method of making laminated ceramic articles, and more particularly articles such as refractory bricks, safety tread tiles and abrasive stones which have a surface portion containing refractory or abrasive material and a backing of a different ceramic composition. This case is a continuation in part of our application relating to a safety tread ceramic tile, on which was granted United States Patent No. 1,445,083 dated February 13, 1923.

In the use of articles of this type, it is often advisable that a surface portion only contain the refractory or abrasive material. For example, a non-slip tile made of crystalline alumina granules bonded with vitrified clay materials has such durability and wear-resisting properties and consequently such a long life that it is not necessary to incorporate the comparatively expensive anti-slipping abrasive grains in the lower portions of the tile. Also, refractory bricks intended to be exposed to the destructive action of chemical gases, slag, or molten baths, may have the exposed face consisting mainly of the refractory grains, such as silicon carbide or crystalline alumina, and the rear face of a vitrified or a fire brick composition. Such a construction is useful where it is desirable that the backing or main body portion of the brick have a relatively low thermal conductivity compared with that of the facing material. Similarly, an abrasive block or a grinding wheel need have the abrasive grains only in that portion which will be used. The part of the block engaged by a clamp or the unused portion of the wheel may be made of relatively inexpensive ceramic materials and form a backing or support for the abrasive layer.

It however is found that owing to the non-shrinkability during firing of the super-refractory materials, which have previously been shrunk at temperatures in excess of those employed in the ceramic kiln, there is a marked difference in shrinkage between two ceramic layers, only one of which contains the preshrunk granules. This results in warpage or cracking of the article during the firing operation.

It is accordingly an object of our invention to provide such laminated or complex articles which will not be warped or cracked to a detrimental extent during manufacture and which may be economically and easily produced.

A further object is to provide laminated ceramic articles which are durable and of high tensile strength, capable of withstanding heavy loads and crushing strains, such as are imposed upon flooring surfaces, as well as the stresses incident to the use of abrasive blocks and of refractory bricks adapted to be employed in the construction of high temperature furnaces.

It is a further object of our invention to provide a feasible and economical method of forming a ceramic article of the class described by substantially equalizing the shrinkage in the different portions of such a multi-layer body whereby the facing containing the high content of preshrunk grains may remain integrally united with the ceramic backing.

With these and further objects in view as will be apparent in the following disclosure, our invention resides in the subject matter described hereinafter and covered by the claims appended hereto.

In accordance with our invention, we propose to make articles of this class by employing such compositions and methods of manufacture as will increase the burning shrinkage of that layer which contains the material of low shrinkage and thereby sufficiently equalizing the shrinkages of the various layers of the body to produce a coherent mass. In certain cases, we also reduce the shrinkage of the backing layer by a proper selection of ingredients therefor. This invention relates to laminated articles containing two or more layers, but it is considered sufficient to describe it merely in connection with the manufacture of a two-layer article, the principles underlying our discoveries being the same for the larger number of layers. It will, therefore, be understood that if the differences in the shrinkage between the two layers be excessive, a middle layer having an intermediate shrinkage value may obviously be interposed, it being unnecessary to have the layers of exactly equal shrinkage but merely to reduce the shrinkage differential to a practicable amount.

As a specific embodiment of this invention, a refractory brick or a safety tread tile may be made of super-refractory abrasive material, such as crystalline alumina or silicon carbide, the grains of which are bonded by vitrified ceramic materials into an integral facing layer which is backed by a fired ceramic body such as vitrified materials. If, for example, crystalline alumina is selected, we may employ either materials found in nature, such as corundum or emery of various amounts of impurities, or preferably the artificial materials made by fusing bauxite or alumina-containing ores in the electric furnace and thereafter cooling and crystallizing the melt. This material is ground to a desired grain size in accordance with the use to which it is to be put, and as is well known in the ceramic art the bonding ingredients employed therewith will be modified to produce the desired durability, hardness and other properties required. In order to unite these granules into an integral layer, we preferably employ ceramic materials which are vitrifiable within the range of the ordinary ceramic firing operation, this bond being so selected in its ingredients and proportions that at the temperature of firing it will be vitrified to a porcelanic or a vitreous condition which will unite integrally with the surface of the granules and hold them together.

If the backing layer were made of the same ingredients as the face layer minus the super-refractory granules, it is clear that the backing would shrink more than the face layer since the granules, having been formed in the electric furnace at a temperature far in excess of the ceramic kiln firing operation, have been preshrunk to a substantially uniform volume. Moreover, if one adopted the expedient of adding decreasing amounts of the refractory granules to the successive layers which make up the multi-laminated article, this difference in shrinkage value would result in the article being warped.

It therefore is one of the main features of our invention to employ such bonding ingredients with the super-refractory granules that the shrinkage of the layer containing them will be substantially equalized during the firing operation to that of the backing layer which is devoid of such granules.

We may employ various materials for the backing, but preferably utilize a main ingredient which is capable of vitrifying at the firing temperature. As an example, one may use a ball clay such as Mississippi ball clay. This backing may contain various ingredients which modify the properties of the main vitrifying material or change the burning temperature or vitrifying point of the mass, of which we may mention such well known ingredients as feldspar, whiting, flint, talc, steatite, etc. As a further expedient to reduce the shrinkage of the backing, we may incorporate therein various materials which have a low shrinkage at the temperature of firing. For example, we may employ fragments of porcelain or grog which have been previously fired at a temperature above that to which the article will be subsequently exposed.

As a specific example of one backing composition we may employ ball clay mixed with feldspar and flint in the following proportion:

| | Parts by weight. |
|---|---|
| Ball clay | 35 |
| Feldspar | 25 |
| Flint | 40 |

In order to provide articles such as are suitable for refractory bricks, abrasive blocks and non-slip tiles, it is usually required that the refractory and abrasive material constitute the major portion, and ordinarily at least 70% of the mass. Hence, in order to employ a bond which will increase the shrinkage of this service layer to that in the backing, it is necessary to utilize ingredients which are highly fluid at the temperature of firing and we accordingly employ such vitrifiable clay materials as have low melting points or modify the properties of other suitable ceramic materials by adding thereto such fluxes or other ingredients as will materially lower the fusion point of the mass. As a specific example of a material which is highly suitable for this purpose, we may employ manganese carbonate with ceramic materials which are commonly employed in this art, such as ball clay, flint, whiting and feldspar.

As a specific example of the composition of a satisfactory article, the following ingredients in the proportion mentioned may be employed:

*Facing bond.*

| | Parts by weight. |
|---|---|
| Feldspar | 167.4 |
| Whiting | 70.0 |
| Ball clay | 51.6 |
| Flint | 108.0 |
| Manganese carbonate | 28.0 |
| | 425.0 |

*Non-slip facing.*

| | Per cent. |
|---|---|
| Facing bond | 20 |
| Crystalline alumina granules | 80 |

*Body or backing material.*

| | Parts by weight. |
|---|---|
| Ball clay | 35 |
| Feldspar | 25 |
| Flint | 40 |
| | 100 |

Another composition for the backing may be constituted as follows:

| | Parts by weight. |
|---|---|
| Fire clay grog (16 mesh and finer) | 25 |
| Feldspar | 37½ |
| Ball clay | 22½ |
| Potter's flint | 15 |
| | 100 |

This will be just as hard, dense and strong as the composition already given but will have a somewhat smaller shrinkage in firing, thus allowing for a somewhat smaller content of manganese carbonate in the facing composition.

As a specific method of forming such an article, we may mix the desired proportions of crystalline alumina granules and facing bond with water so that the mass may preferably be molded in a press. This is placed in the bottom of a mold of suitable dimensions and the mold is filled with the vitrifiable clay backing material which has previously been mixed and moistened with water to the desired amount to render the material capable of being molded in a dry press. After subjecting the mass to pressure to form the body, it is dried and then burned in a suitable ceramic kiln at cone 13 or a maximum temperature of about 1300° C. for a suitable length of time, e. g. one hundred hours, after which it is cooled slowly for a similarly long time. In this firing operation the alumina granules are bonded together by the ceramic material as a dense mass, the backing is formed into a hard vitrified body and the two portions of the article are intimately and permanently united.

The sizes and the proportions of the super-refractory grains employed will determine the shrinkage value and density of the face layer, hence if the grains are so combined as to make the face layer incapable of any considerable shrinkage, we compensate therefor by loading the backing with non-shrinking material such as granules of flint, crushed porcelain, etc., to such an extent as to neutralize the shrinkage.

Referring to the drawing, which represents a perspective view, partly in section, of a laminated brick for refractory uses, we have there shown one embodiment of our invention comprising a ceramic body 1 having a refractory face portion 2 of ceramic bonded alumina granules, and a backing 3 of vitrified or porcelanic material, which need not be as refractory as the facing, and hence is made devoid of the crystalline alumina granules, but may contain a small amount thereof or of other suitable preshrunk granular material.

Having thus described our invention, what we claim as new and desire to secure by Letters Patent, is:

1. The method of making a multi-layer ceramic article having a super-refractory facing and a less refractory backing comprising the steps of superimposing a backing of plastic ceramic material and a facing of pre-shrunk refractory granules incorporated with a vitrifiable ceramic bond containing a flux capable of substantially equalizing the shrinkage of the two layers during the firing operation and thereafter firing the mass to bond said granules and unite the backing therewith.

2. The method of making a laminated ceramic article having a facing of bonded super-refractory grains and a less refractory backing, comprising the steps of providing a backing of ceramic material containing a pre-shrunk refractory ingredient, superimposing a layer thereof with a layer of pre-shrunk super-refractory grains and a vitrifiable ceramic bond containing a flux capable of substantially equalizing the burning shrinkage of the two layers and thereafter firing said layers to bond the granules and unite the backing therewith.

3. The method of making a laminated ceramic article containing super-refractory grains in one face portion only, comprising the steps of incorporating with said grains a ceramic bond containing a vitrifiable clay and a flux capable of increasing the shrinkage of said clay during the firing operation, superimposing therewith a layer of a less refractory ceramic material which has substantially the same firing shrinkage as that of the facing, and thereafter firing the mass to bond said granules and unite the backing integrally therewith.

Signed at Worcester, Massachusetts, this 1st day of Feb. 1923.

GEORGE N. JEPPSON.
MILTON F. BEECHER.